United States Patent Office 3,563,925
Patented Feb. 16, 1971

3,563,925
COMPOSITION CONTAINING INTERLOCKED FOAMS OF PARTLY TANNED COLLAGEN AND CROSS-LINKED GLYCOL METHACRYLATE POLYMER
Karel Kliment, Miroslav Stol, and Milos Chvapil, Prague, Czechoslovakia, assignors to Ceskoslovenska akademie ved, Prague, Czechoslovakia
No Drawing. Filed Dec. 20, 1967, Ser. No. 691,947
Int. Cl. C08f 47/08; C08h 7/00
U.S. Cl. 260—8                3 Claims

ABSTRACT OF THE DISCLOSURE

A continuous solid material consisting of interlocked three-dimensional networks of hydrated, partly tanned collagen and sparingly cross-linked, hydrated polymers of glycol methacrylate, when made into blood vessels, urinary bladders, and other body parts, is impervious to liquid when freshly implanted, yet readily penetrated by tissue growth, and well tolerated when the pores in the polymer are between 150 and 450 microns in diameter, and the collagen amounts to 10%–50% of the total dry weight of polymer and collagen.

BACKGROUND OF THE INVENTION

This invention relates to artificial body parts and more particularly to replacements for blood vessels, urinary bladders, and other body organs.

Various materials have been used for the reconstruction of blood vessels with some success. It is necessary that an artificial blood vessel be liquid-tight when implanted, yet that it be permeated by tissue growth over a reasonably short period if it is not to be rejected by the body. The material must become porous after implantation to accept the tissue, yet must not permit passage of blood. Similar considerations apply to artificial structures replacing all or a portion of the pharynx, the trachea, or the urinary bladder, but initial impermeability to liquid combined with later porosity is also desirable in flat implants intended to replace portions of the skin, cerebral membranes, and the like. Inertness of the implant to body tissues is an obvious and necessary condition.

Various tubular body organs were replaced heretofore by collagen films reinforced by porous polyester fabric in which the collagen provided an initial barrier impermeable to water, but was resorbed by the body to permit the growth of surrounding tissue into the pores of the loose fabric. While some success was achieved with the polyester-collagen implants, difficulties were encountered in providing a reliable bond between the fabric and the collagen which could resist surrounding moisture at 37° C. Separation of the collagen from the supporting fabric impaired the fluid-tightness of the implant.

While the collagen can be tanned partially to control its rate of absorption by the body, a collagen film tanned to permit resorption within a reasonable period is still mechanically weak and flexible. It was not possible to produce fabric-reinforced collagen-polyester tubes of sufficient rigidity to permit their use for the replacement of large veins, portions of the trachea or of the pharynx. A body consisting of polyester-reinforced collagen also cannot be machined or otherwise further shaped after it has been formed.

SUMMARY OF THE INVENTION

It has now been found that all the desirable properties of the collagen-polyester material without the aforementioned shortcomings are possessed by a material which is a continuous solid and essentially consists of hydrated, partly tanned collagen and a sparingly cross-linked, hydrated polymer of glycol methacrylate in which the collagen and the polymer form respective porous, three-dimensional, unitary networks, the pores in each network being filled with the material of the other network.

To permit most favorable ingrowth of tissue, the pores in the polymer should not be substantially narrower than 150 microns, nor substantially wider than 450 microns, and the best artificial organs have been prepared from bodies in which the amount of the collagen was between 10 and 50 percent of the combined amount of the polymer and collagen on a dry basis.

The preferred cross-linking agent in the polymer is glycol bis-methacrylate, but others, may be employed as is known in this art. The cross-linking agent, however, should not exceed two percent of the monomer mixture from which the polymer gel is prepared.

Other features and many of the attendant advantages of this invention will readily become apparent from the following detailed description of preferred embodiments which, however, are not intended to limit the scope of the invention.

DESCRIPTION OF PREFERRED EMBODIMENTS

EXAMPLE 1

A piece of partly tanned collagen foam prepared by by the method of the French Pat. No. 1,441,817, more specifically, Example 4 of the patent, was placed in a vacuum to remove the air from its pores. It was then immersed in a liquid monomer mixture of the following composition, in parts by weight:

| | Parts by weight |
|---|---|
| Ethyleneglycol monomethacrylate | 40 |
| Ethyleneglycol bis-methacrylate | 0.1 |
| 0.25% aqueous ammonium persulfate solution | 59.9 |

The piece of collagen foam was covered with a glass plate which was loaded with sufficient weight to squeeze about 25% of the monomer mixture from the pores of the collagen foam while the piece was confined in an upwardly open vessel. The excess of monomer solution was carefully removed from the vessel which was then filled with carbon dioxide, and the polymerization of the monomer mixture in the pores of the weighted collagen foam proceeded for two hours at ambient temperature (about 25° C.).

The soft and pliable product so obtained was washed in water until all monomer and catalyst were removed. It was stored in physiological saline solution for direct implantation. When quickly frozen by means of liquid nitrogen or liquid air, it could be cut into sheets of any desired thickness or machined in any desired manner, and reverted to its original condition upon thawing. The hard material obtained from the original washed gel by careful drying at low temperature in a vacuum was similarly capable of being shaped by the usual tools of a mechanic, and returned to its gel condition upon contact with water or physiological saline solution. The finished objects could be stored in physiological saline solution with or without antibiotics.

EXAMPLE 2

A tube of partly tanned collagen foam was placed in an upright glass tube, and an expandable plastic tube was inserted into the bore of the collagen tube. The glass tube was evacuated to remove air from the pores of the collagen foam, and the latter were then filled with a monomer solution having the following composition in parts by volume:

| | Parts by volume |
|---|---|
| Ethyleneglycol monomethacrylate | 50 |
| Ethyleneglycol bis-methacrylate | 0.5 |
| 0.25% aqueous ammonium persulfate solution | 49.5 |

Carbon dioxide was thereafter admitted to the plastic tube to squeeze excess monomer from the foam tube, the excess monomer solution was drawn off by means of a pipette, the glass tube was filled with carbon dioxide and closed, and was then rotated about its vertical axis at 600 r.p.m. until polymerization was complete (about two hours).

The collagen-polymer body obtained was thoroughly washed, and stored in physiological saline solution until it was about to be implanted as a substitute blood vessel.

EXAMPLE 3

35 parts (by weight) hydrated collagen containing approximately 14% dry solids and 15 parts glycerol were mixed by means of a motor-driven agitator, and the mixture was thereafter homogenized for a short time. 50 parts glycol monomethacrylate containing 0.28 part glycol bis-methacrylate were thoroughly stirred into the mixture together with a small amount of bacitracin and fungicidin, and trimethylol melamine in an amount of 0.3 percent based on the dry weight of the collagen. 0.1 part di-isopropyl peroxocarbonate was admixed last as a polymerization initiating agent, and the mixture was again homogenized for 7 minutes under a carbon dioxide blanket.

A flat glass dish was filled with the mixture which was permitted to stand in the inert atmosphere at room temperature for about 36 hours. The disc of material so prepared was lyophilized at −35° C., and the partly dehydrated product was sufficiently rigid to permit shaping by mechanic's tools.

EXAMPLE 4

A mixture catalyzed with di-isopropyl peroxocarbonate was prepared as in Example 3 and placed in an upright glass tube whose bottom end had been closed, and the tube was rotated about its axis at about 2500 r.p.m. at ambient temperature. The initially fluid, but viscous material became shape retaining in about 10 hours, and the tube was permitted to stand still until polymerization was completed after a total elapsed time of 24 hours.

The tubular mixture of collagen and polymer was then withdrawn from the glass tube which had served as a mold, and lyophilized to permit mechanical shaping, as described above, into a portion of a trachea.

EXAMPLE 5

Hydrated collagen containing 7.5% dry solids was mixed with 0.2% trimethylol melamine as a tanning agent, poured in a dish, and subjected to freeze drying at −35° C., whereby a collagen sponge or foam was produced as described in the afore-mentioned French patent.

The collagen foam was covered with a layer of the following monomer mixture:

| | Parts by volume |
|---|---|
| Glycol monomethacrylate containing 0.28% glycol bis-methacrylate | 70.0 |
| Aqueous 0.5% ammonium persulfate solution | 29.5 |
| Dimethylaminoethyl acetate | 0.5 |

The dish was then placed in a chamber which was first evacuated and then filled with nitrogen. The polymerization was completed in about one hour, and the block so produced was frozen at −5° C. and sliced into membranes in the frozen condition. The membranes when thawed and brought to equilibrium by immersion in physiological saline solution were used as skin grafts.

A similar material was prepared from a monomer mixture of the following composition:

| | Parts by volume |
|---|---|
| Glycol monomethacrylate containing 0.28% glycol bis-methacrylate | 70.0 |
| Glycerol | 27.75 |
| Aqueous 10% ammonium persulfate solution | 2.0 |
| Dimethylaminoethyl acetate | 0.25 |

EXAMPLE 6

A collagen foam layer 2mm. thick was deposited on a glass plate held in a precisely horizontal position. It was covered with a freshly prepared mixture of 60 ml. ethyleneglycol methacrylate containing 0.24% ethyleneglycol bis-methacrylate dissolved in 240 ml. distilled water, 5 ml. 2% aqueous ammonium persulfate solution, and 0.2 ml. dimethylaminoethyl acetate. The plate was then placed in a chamber which was first evacuated to remove air from the foam, and thereafter filled with nitrogen at approximately atmospheric pressure to force the monomer mixtures into the pores of the foam, and to displace ambient oxygen.

When polymerization was completed, a strong white sheet of interlocked collagen and polymer was peeled from the glass plate and further processed as described above.

The collagen-polymer bodies prepared by the methods of the several examples, when inspected under the microscope in thin sections, were found to consist of interpenetrating, three-dimensional networks of hydrated collagen and hydrated polymer. The ratio of collagen and polymer, on a dry basis, was approximately 30% collagen and 70% polymer, on a dry basis, and the collagen-filled pores in the polymer structure had a width or diameter of 200 to 250 microns.

The pore size in the polymer structure could be controlled by varying the amount of water employed in the preparation of the collagen foam. When a larger amount of water was used under otherwise similar conditions, the voids in the foam obtained were enlarged and the wall thickness of the collagen was reduced, thereby reducing the size of the collagen-filled pores in the polymer network, and vice versa.

The ratio of collagen and polymer was readily controlled by varying the pressure applied to the collagen foam after immersion in the monomer solution for expelling an excess of the latter. Higher pressure applied at this stage, as by increasing the rotary speed of the glass mold in Example 2, increased the collagen content of the ultimate product.

While the necessary pore size in the polymer for most successful implantation has been well established at approximately 150 to 450 microns, and a collagen content of 10% to 50% on a dry basis has been found to be most desirable, the methods of accomplishing such properties in making the implants of the invention are still based largely on trial and error. However, the necessary parameters under a specific set of operating conditions are established in a simple manner. Preliminary data can be developed from microscopic measurements of the collagen foam and by determining the amount of liquid a foam produced under known conditions can absorb.

The size of the collagen-filled pores in the polymer network determines the period required by connective tissue to grow into a prosthesis made from the material of this invention. The preferred pore size and a collagen content of at least 15% of the combined dry weight of collagen and polymer cause ingrowth of tissue over a period of four to eight weeks in subcutaneous or subperiosteal applications. Most satisfactory results were generally obtained with a collagen content of about 30% as described in the examples.

The collagen-polymer material of the invention is readily given any desired shape by selecting the molds in which the polymerization takes place.

The material of the invention is characterized by a firm bond between the polymer and collagen phases. For reasons not yet entirely understood, the tensile strength of the material is substantially greater than the combined strength of collagen foam and polymer of equivalent cross section. It can be sutured by conventional surgical techniques.

After resorption of the collagen, the residual polymer is fully compatible with body tissues. Unusually good results have been obtained where the implants were directly superimposed on bones, as in the replacement of cartilege. The polymer gel appears to be self-lubricating, and thus not to be worn down by contact with bone.

If an excess of monomer solution cannot be removed prior to polymerization, an undesirable surface layer of polymer may form on the material, and should be cut away prior to implantation since it impedes tissue growth. On the other hand, a thin surface layer of collagen free from polymer is not harmful if it can be resorbed quickly in the body. The rate at which the collagen is removed after implantation depends on the degree of tanning in a known manner. It is also known to incorporate anticoagulant and bacteriostatic agents in implants of the type discussed, and such agents are readily incorporated in the material of the invention in an obvious manner.

Collagen is denatured by temperatures above 57° C., and the material of the invention thus cannot be sterilized by high heat, but the material resists exposure to radiation emanating from radioactive cobalt or to gaseous ethylene oxide which may be employed in a conventional manner to achieve the necessary sterility of implants made from the material of this invention.

While the invention has been described with particular reference to specific embodiments, it is to be understood that it is not limited thereto, but is to be construed broadly and restricted solely by the scope of the appended claims.

We claim:
1. A solid material consisting essentially of hydrated, partly tanned collagen and a sparingly cross-linked, hydrated polymer of glycol methacrylate, said collagen and said polymer forming respective porous, three-dimensional, unitary foam networks, the pores in each network being filled by the material of the other network, the pores in said polymer being not substantially narrower than 150 microns nor substantially wider than 450 microns, the amount of said collagen being between 10 percent and 50 percent of the combined amount of said collagen and of said polymer on a dry basis.

2. A material as set forth in claim 1, wherein said amount of collagen is approximately 30 percent of said combined amount.

3. A material as set forth in claim 2, wherein the width of said pores in said polymer is approximately 200 to 250 microns.

References Cited
UNITED STATES PATENTS

| | | | |
|---|---|---|---|
| 2,719,072 | 9/1955 | Kine | 8—115.6 |
| 3,220,960 | 11/1965 | Wichterle | 260—2.5 |
| 3,285,775 | 11/1966 | Tu et al. | 117—141 |

SAMUEL H. BLECH, Primary Examiner

W. J. BRIGGS, Sr., Assistant Examiner

U.S. Cl. X.R.

3—1; 128—334; 260—2.5, 6, 851; 424—81